US006980487B2

(12) United States Patent  
Davies et al.

(10) Patent No.: US 6,980,487 B2
(45) Date of Patent: Dec. 27, 2005

(54) UNDERWATER COMMUNICATION SYSTEM (75) Inventors: Jonathan James Davies, Dorchester (GB); Shaun Michael Dunn, Dorchester (GB); Stephen Arthur Pointer, Dorchester (GB); Samuel William Downer, Dorchester (GB)

(73) Assignee: Qinetiq Limited, (GB)

( * ) Notice: Subject to any disclaimer, the term of this patent is extended or adjusted under 35 U.S.C. 154(b) by 0 days.

(21) Appl. No.: 10/473,274

(22) PCT Filed: Mar. 28, 2002

(86) PCT No.: PCT/GB02/01510

§ 371 (c)(1),
(2), (4) Date: Sep. 30, 2003

(87) PCT Pub. No.: WO02/082695

PCT Pub. Date: Oct. 17, 2002

(65) Prior Publication Data

US 2004/0090865 A1 May 13, 2004

(30) Foreign Application Priority Data

Apr. 2, 2001 (GB) ................................ 0108188

(51) Int. Cl.⁷ .......................................... H04B 11/00
(52) U.S. Cl. .................................................. 367/134
(58) Field of Search .............................. 367/131, 134, 367/901, 904

(56) References Cited

U.S. PATENT DOCUMENTS

| 2,141,619 | A   | 12/1938 | Sauter ................... 110/182.5 |
| 3,867,715 | A   | 2/1975  | Geil ....................... 367/132 |
| 4,563,758 | A   | 1/1986  | Paternostro .............. 367/132 |
| 5,530,682 | A   | 6/1996  | Brosow .................... 367/134 |
| 5,784,339 | A   | 7/1998  | Woodsum et al. .......... 367/134 |
| 6,125,080 | A   | 9/2000  | Sonnenschein et al. ..... 367/134 |
| 6,133,849 | A   | 10/2000 | McConnell et al. ... 340/825.72 |
| 6,158,041 | A   | 12/2000 | Raleigh et al. ............ 714/792 |
| 6,512,720 | B1* | 1/2003  | Yang ....................... 367/134 |

FOREIGN PATENT DOCUMENTS

| EP | 0 048 779  | 4/1982  |
| EP | 0 244 629  | 11/1987 |
| GB | 2139788    | 11/1984 |
| GB | 2144949    | 3/1985  |
| WO | WO 00/58747 | 10/2000 |

* cited by examiner

Primary Examiner—Daniel Pihulic
(74) Attorney, Agent, or Firm—McDonnell Boehnen Hulbert & Berghoff LLP (57) ABSTRACT In a digital acoustic transmission device in which a digital sequence (31) is electrically modulated (22) on a carrier cos ωt, the modulated carrier (23) is prefaced with at least two pulse signals (24) of known timing relative to each other and to the modulated digital sequence to provide an output signal (13) for acoustic transmission. The pulse signals indicate to receiver the start of a transmission, and contain Doppler information for resampling the modulated signal prior to demodulation. Where the information sequence is in encoded blocks of equal length, the relationship between successive blocks can be used to update the Doppler information for use with the following block. Channel information can also be derived from the pulse signals and/or blocks for raking the next part of the incoming signal. Preferably the pulse signals have good correlation characteristics. In the embodiments the pulse signals are an immediately successive identical pair of linearly rising chirps.

32 Claims, 8 Drawing Sheets

UNDERWATER COMMUNICATION SYSTEM

The present invention relates to communication systems suitable for use through or under water.

Communicating reliably under water is difficult. It is known to use VLF electromagnetic communication (up to 10 KHz), but this requires high power and large antennae, and so is limited to communications involving ships and submarines, being inapplicable for personal use, for example when diving.

For short range communication ultrasonic waves in the region of 20 to 600 KHz may be employed. Nevertheless signal transmission is subject to Doppler effects, nonlinear speed of propagation (for example due to different regions of water density and temperature), multipath propagation (also known as reverberation), fading and other environmental disturbances including noise and other acoustic sources.

Acoustic underwater communication systems using analogue modulation of an acoustic carrier is known but is regarded as inefficient, particularly for underwater networking. A known manufactured device uses SSB modulation by a diver's voice of a 32 to 40 KHz carrier. U.S. Pat. No. 4,653,758 discloses a system permitting acoustic communication between two divers which employs a voice synthesiser. Another known system relates to a diver to diver communication system where messages are determined by audible tone or duration, and a flashing beacon serves for locating the diver in an emergency. In the system disclosed in Canadian Patent Application No. 2,141,619 an AM modulated message is transferred between divers, the receiving device emitting a message which is easily audible to the diver carrying the device.

All of these analogue systems or devices are only effective over a relatively low range, typically no more than 150 metres, and the communication is "line of sight" only.

U.S. Pat. No. 6,125,080 (Divecom) relates to an underwater communication system using binary digital communication with one or more FSK carriers. Related International Patent Application No. PCT/IL00/00167 (Wulich Wave Ltd) is additionally directed to determining the angular location of a transmitter relative to a receiver, for example the location of a diver relative to a boat. In one embodiment of Divecom, each diver device of a plurality is assigned a channel comprising a pair of frequencies peculiar thereto, together with, optionally, an emergency frequency common to all devices. The device normally listens for messages only on its channel (and the optional emergency channel). When a diver wishes to communicate, a stored message in the device is selected and modulated by a binary FSK modulator to produce a binary sequence on the channel corresponding to the desired destination device, the sequence then being passed through a DAC. Once it has been confirmed that the channel is free, by listening on that channel, the message is transmitted. The signal path for the received signal is generally the reverse of that for the transmitted signal.

In the digital systems disclosed in Divecom and Wulich Wave Ltd it is necessary for each diver device to have the ability to operate at different FSK carrier frequencies according to the destination device.

There are a number of problems associated with acoustic communication, which lead to difficulty in recovering the transmitted signal, and which may become particularly severe when the communication includes an underwater path. Narrowband signals, such as are employed in Divecom and Wulich Wave Ltd, have a tendency to fade, and it is for this reason that both of these documents disclose the use of signalling on two distinct frequency separated carriers, so that even if one signal fades the other one might be sufficiently strong to be recovered and decoded. Furthermore the transmitted signal is subject to Doppler frequency shifts which may vary randomly and over a short timescale relative to the length of a transmission.

In addition, the signal is almost invariably subject to significant multi-path propagation. The available energy becomes shared between the strongest or main signal, commonly but not necessarily the direct signal, and subordinate signals which arrive after or before the main signal. Not only does this lead to a reduction in the amplitude of the main signal, but the subordinate signals can degrade the main signal during subsequent processing. The multiple paths, which define a channel structure, are also subject to random and relatively rapid variations (relative to a transmission length), both as to path length and signal strength. Significant signals other than the main signal will hereafter be referred to as "sub-signals".

Thus a major concern is to provide a method of communication which is reliable and resilient to the effect of errors however introduced, but particularly those peculiar to underwater transmission, including background noise, multi-path propagation and acoustic Doppler.

Our copending UK Patent Application No. 0108188.4 (ref: P21364GB) relates to a digital transmission system in which coding methods are adopted so that the signal is effectively relatively broadband, thereby avoiding or reducing the problem of signal fading. Furthermore, means are adopted to detect and compensate for Doppler and phase shifts in the received signal, and to detect multipath arrivals of the received signal and to process it so that the overall signal strength, and signal to noise ratio, is increased. In the preferred embodiments thereof a narrowband signal is mapped to a number of relatively broadband signals with correlation properties better suited to resolving and exploiting multipath propagation in underwater environments.

In a first aspect the present invention relates to a digital acoustic transmission device comprising transmission transducer means for transmitting an acoustic signal through water in response to an output signal, means for receiving or generating a digital information sequence, means for modulating said digital information sequence on a carrier, and means for coupling the modulated digital sequence to said transducer means, wherein said coupling means includes means for prefacing said modulated carrier with at least two pulse signals of known timing relative to each other and to the modulated digital sequence to provide said output signal.

The digital information sequence will commonly vary according to the information it is intended to convey, for example a message and/or an identifier peculiar to a receiving device. However at least a part thereof may be predetermined, corresponding to fixed information from the device, for example a fixed header sequence which can be used to help in signal processing, as will be described later, or a fixed identifier stored in and peculiar to the transmission device. The information sequence may also include a selected one from a plurality of receiving device identifiers stored in the transmission device for selective addressing of a receiving device. The transmission and/or receiving identifiers will have respective predetermined positions or slots in the information sequence for recovery thereof. In a variant, each or any of these items can be added to or inserted in the modulated signal as modulated sequences, for example a modulated fixed header sequence can be added to the front of the modulated digital sequence, and this is regarded as effectively providing an information sequence with a fixed header.

The digital information sequence may be supplied to the transmission device; alternatively or additionally the transmission device may generate at least part of the information sequence, for example by providing means including one or more of (a) a manual input means and optionally a display for responding to operation of the manual input means; (b) measurement means for measuring a condition at the transmitting device for providing at least part of said digital information sequence; and (c) voice input means.

The pulse signals are used to indicate the start of a transmission, and the variation in spacing between the pulses as received at a remote site could be used to provide information regarding Doppler. Another way of determining Doppler is by monitoring a frequency characteristic of a chirp. Generally only a pair of pulses is needed, but additional pulses could be provided if desired. Multi-path transmission (channel structure) data can also be derived from the two pulse signals as received. Preferably the pulse signal waveforms have good correlation properties.

A preferred form of pulse signal is a chirp, although other waveforms are possible. It may be a chirp with a frequency which rises or falls with time, linearly or non-linearly, or even a chirp with a more complex envelope, such as a linearly rising portion followed by a linearly falling portion (as with two back-to-back chirps). Conveniently the different pulse waveforms are the same, but they could differ in starting and/or ending frequency, duration, envelope or any other characteristic parameter.

Where a predetermined header sequence is provided, the relation thereof to the pulse signals may also be used to provide Doppler and/or channel structure information, or to update such information as already obtained from the pulse signals.

The digital information sequence may be directly representative of the information to be conveyed, i.e. a primary digital information sequence. However, preferably the transmission device includes redundancy means such as a Reed-Solomon encoder for incorporating redundancy into a primary digital information sequence and/or encoding means for encoding the primary digital information sequence, and preferably both the redundancy means and the encoding means are present.

One preferred form of encoding means breaks the primary sequence into blocks (also known as symbols) of length n, where n is one or more, presently preferred values of n being 2, 3 or 4, and encoding each symbol separately to produce a unique corresponding string of $m$ bits where $m$ is greater than $n$. There are potentially $2^n$ symbols, and by an appropriate choice of encoding method, a corresponding set of $2^n$ strings out of a possible $2^m$ can be provided which have good correlation properties, to increase the reliability of detecting the correct symbol during the decoding process and/or of avoiding interference from contemporaneous transmissions (see below). Where a predetermined header sequence is provided, this will provide at least one symbol, and hence at least the first string. Generally some form of correlation process will be used to identify the corresponding symbols from the received encoded sequences.

Our copending UK Patent Application No. 0108188.4 (ref: P21364GB) requires that the value of m/n is at least 32. The use of the encoded symbols is regarded as engendering a broad band characteristic to the acoustic communication.

Once a correct symbol has been identified from the decoding process, the temporal relation of the corresponding string relative to the preceding string, or, for the first string, the temporal relation to a said pulse waveform, can also be used to provide further Doppler information to update the existing information for use in connection with a following sequence. By correlating the identified symbol against its raw received sequence, channel structure information can be gained for processing a subsequent received sequence.

For accurate identification of a received sequence by correlation, it is preferred to employ an encoding code for which the $2^n$ sequences which are used can provide the best auto-correlation properties, such as a pseudo-random maximal length sequence (m-sequence) encoding. However, for preventing or rejecting interference from other contemporaneous transmissions it would be preferable to employ an encoding code for which the $2^n$ sequences which are used can provide the best cross-correlation properties, such as a Gold code or a Kasami code, each of which has bounded cross-correlations. The two requirements cannot in general be met simultaneously, although the cross-correlation performance provided by pseudo-random maximal length sequence encoding, and the auto-correlation performance provided by Gold and Kasami coding are sufficiently satisfactory for the purpose.

Thus although it is preferred that any encoding code which is used in the present invention to have good correlation properties, the type of code which is selected will reflect the balance between reliability of decoding a message which is intended to be received, and the reliability of rejecting messages which are not intended to be received, and this will in turn be at least in part determined by the circumstances in which any transmitter-receiver pair is going to be used.

The embodiment employs m-sequence encoding as better suited to dealing with the multi-path problem. However, it should be understood that in subsequent references thereto, other types of encoding such as those mentioned above could be substituted.

In a particularly preferred form of the invention, each symbol is replaced by an extended encoding sequence in which a prefix is added to the corresponding base encoding sequence of m-bits which duplicates the chip pattern in a last portion of the base sequence and/or a suffix is added to the corresponding code sequence duplicating the chip pattern in a first portion of the base sequence.

When the carrier is received and demodulated, each extended sequence can be correlated with each of the $2^n$ unextended (base) encoding code sequences to determine which symbol the extended sequence represents (the maximum likelihood result).

In a second aspect the invention provides a digital underwater receiving device adapted for responding to a signal transmitted from a transmission device according to the first aspect, the receiving device comprising receiving transducer means for receiving said acoustic signal, and pulse waveform detection means for identifying the occurrence of said two pulse signal waveforms as the commencement of a transmission, and means for demodulating or down-converting the carrier modulated output of the receiving transducer means to provide a received said digital encoded signal.

The Doppler effect in the received acoustic signal means that the received frequencies differ from the transmitted frequencies, and that the timing of different signal components is altered. The receiving device may include means for correcting the received modulated signal for Doppler effects, for example by appropriately resampling the modulated signal in response to Doppler information, which information may be obtained from the received signal as outlined above.

Multipath acoustic signal propagation means that different acoustic signals from the same transmission will arrive at a receiver at different times, and with different strengths, so that the received signal can be significantly degraded relative to the transmitted signal. Commonly the most direct signal is the strongest, but that is not necessarily always the case.

The receiving device may comprise means for acting upon multi-path information, for example as derived from the received signal in a manner outlined above, for raking the received signal at some stage in its processing, By "raking" is meant the retiming of at least some of the multi-path components to bring them into synchronism, and adding the synchronised signals so that they reinforce each other. In this way the signal to noise ratio, or the veracity, of the received signal is improved.

The pulse waveform detection means may comprise first correlation means for correlation of each received pulse waveform against a stored version of the pulse waveform. Each correlation in itself can provide information regarding channel structure, and also the two results together can provide the timing information necessary for determining the Doppler effect.

However, in a preferred embodiment, the correlation result for the first pulse waveform is cross-correlated against the correlation result for the second waveform to provide a measure of Doppler effect. This can then be used to correct at least a first part of the modulated received signal. The channel structure information from one of the pulse waveforms could be used for raking at least a first part of the modulated received signal. While these corrections could be applied to the whole modulated received signal, in another embodiment where the received signal comprises encoded sequences, the Doppler and/or channel structure information is continuously updated from information in the received modulated sequences and applied to succeeding sequences.

The receiving device may comprise means for partitioning a received encoded signal into a plurality of received sequences each corresponding to a respective one of the transmitted code sequences, and means for decoding the received sequences to provide said symbols and to synthesise a received said information sequence. The step of partitioning is preferably effected on the basis of the timing when at least one of the pair of initial pulse waveforms is identified, or on such basis as updated from information in the received sequences.

The use of the extended encoded sequences mentioned above can also allow an increased chance of detecting like signals from temporally spaced channels. These may then effectively be brought into synchronism with the main signal and added prior to correlation, thus improving the amplitude of that correlator output which corresponds to the code sequence in the received signal.

However, the main advantage of the use of the extended sequences is that it allows for some spread between the expected and actual timing of the encoded sequences in the received signal, so that the received signal can still usefully be compared with stored reference sequences by correlation. In one preferred embodiment, the originating code sequence is cyclically extended at both ends, so that it sits generally centrally of the extended sequence, allowing for indirect channels which arrive before and after the main signal.

At the receiver, a sequence of m-bits is extracted from the received extended sequence, from a position which should correspond to the position of the originating sequence, and fed to a plurality of correlators corresponding to the set of $2^n$ symbols, so that the correlator corresponding to the symbol should provide the maximum likelihood result for identifying the symbol. Due to the nature of the sequences and the fact that the extensions are cyclic, sidelobes arising from multipath arrivals are significantly reduced.

However, the timing of a maximum likelihood result from the corresponding correlator is variable and will provide a measure of any time displacement relative to the maximum likelihood result for the preceding symbol. Such relative time displacements can be used to update the Doppler information for use in relation to a succeeding encoded sequence. Furthermore, by correlating the encoded sequence for an identified symbol against its unraked encoded extended sequence, it is possible to derive multi-path information for use in raking the succeeding modulated received sequence.

Therefore, in one form of receiver, taking any three encoded sequences which are received in turn, the output of measurements on the first and second encoded sequences is available for a determination of essentially instantaneous Doppler, for correction of the third (later) received sequence, and once the corresponding symbol of the second sequence has been identified the unraked second sequence can provide channel structure for raking of the third sequence. The Doppler corrected and raked third sequence can then be used for symbol identification. In an iterative process, the third sequence then can be used in conjunction with the second sequence for a new determination of Doppler, and the new symbol identification for the third sequence can be used with the unraked third sequence to provide raking information, both new measurements being available for use with respect to a fourth sequence. It should be understood that the invention covers embodiments where neither, either or both of Doppler and channel structure can be continuously updated in this way.

Thus after the initial determination of Doppler and multipath structure information from the pulse pair, or from the pulse pair plus predetermined code sequence, it is then possible to keep either or both items of information updated by the use of information derived from the received modulated encoded sequences as received.

Where auto-correlation and cross-correlation are employed in the processes described above, it may be beneficial from a computational view to effect such processes in the complex domain.

Where the digital information sequence comprises a receiver address at a predetermined position, the receiving device may include means for inspecting that position and comparing the receiver address therein with a stored receiver address peculiar to the receiving device, and means responsive to the result for determining whether the receiving device provides an output.

The receiving device may include means for providing a user recognisable output, such as at least one of (a) a visible display; (b) an acoustic alarm or a visible alarm; and (c) a voice synthesiser or acoustic means for reconstituting transmitted voice information derived from an audio transducer.

The invention extends to a transceivers effectively comprising a transmitting device according to the first aspect and a receiving device according to the second aspect; to communication systems comprising a plurality of such transceivers; to communication systems comprising at least one transmitting device according to the first aspect and at least one receiving device according to the second aspect, and to corresponding receiving and transmitting methods.

Where present, a first known (header) encoded code sequence is preferably used for identification or initial identification of the channel structure rather than by using the two pulse signal waveforms since the encoded sequence has superior correlation properties for which its coding was selected. However, Doppler precompensation to within about 1 knot is necessary before estimating the channel structure, because sequences will decorrelate rapidly with Doppler estimation error and the correlation is also prone to increased sidelobes.

Therefore, in addition to indicating the start of a transmission the two received pulse signal waveforms are employed to obtain an initial measurement of Doppler. This measurement is used to compensate the first known code sequence for the purpose of more precisely identifying the channel structure, and measured Doppler is subsequently applied to remaining code sequences in the received signal for obtaining updated information on channel structure.

As noted above, it is possible continuously to update the measured Doppler by obtaining information from the remaining received code sequences, for example by obtaining a measure of residual (or differential) Doppler from immediately preceding sequence pairs (i.e. a closed loop system). This is not absolutely necessary and adds to the complexity of the system. It is not effected in the embodiment to be described in detail.

One advantage of continuously updating the Doppler information is that it permits adjustment of the absolute start timing of each received sequence, or the relative timing between sequences, in a manner similar to pulse position modulation, so obtaining the data rate to be improved without resorting to more sequences. When closed loop Doppler is used, the use of extended coded sequences is less necessary.

While the invention is useful for divers operating singly with a surface support vessel or as a group with or without a surface support vessel, since a transceiver may be embodied as a portable or wearable device, it is also useful in any underwater communication system, for example underwater vehicles which are manned or remotely controlled, or underwater telemetry apparatus.

The invention extends to a transceiver comprising a transmission device according to first aspects in combination with a receiving device according to the second aspect. It also extends to methods of transmitting and/or receiving a digital signal, to a digital communication system and to a method of communication.

Further features and advantages of the present invention will become clear upon a consideration of the appended claims, to which the reader is referred, and upon a reading of the following description of an embodiment of the invention, in which:

Figure 1:
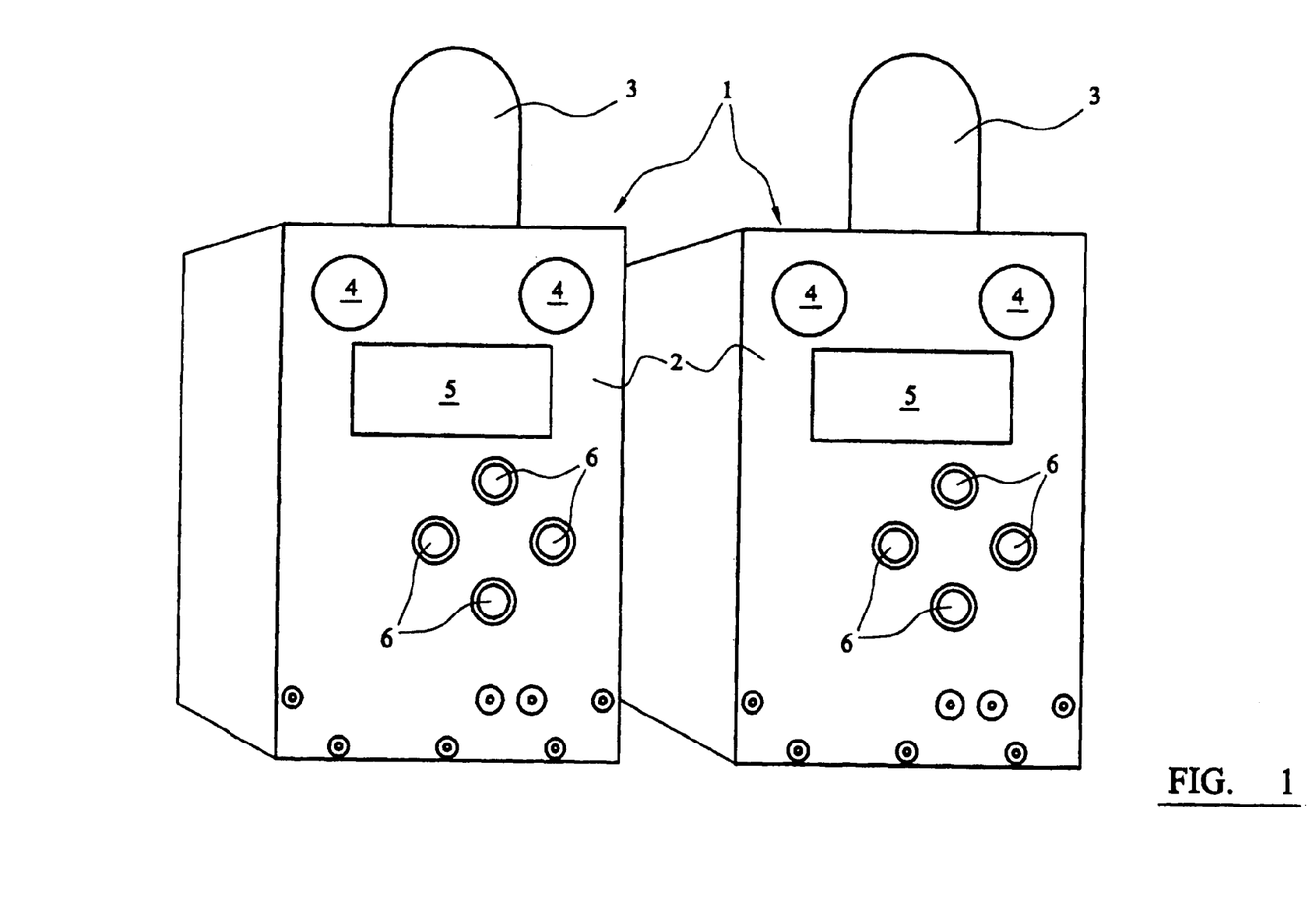
FIG. 1 shows a frontal view of pair of transceivers 1 suitable for intercommunication between a pair of divers, or between a diver and a boat.

FIG. 1 shows a pair of transceivers 1 for use by divers each comprising a metal casing 2 on one end of which is mounted a pair of acoustic hydrophones 4 for receiving acoustic signals. A single acoustic transducer 3 for transmitting acoustic signals is mounted at the top of one major face of the casing, immediately above a window of a liquid crystal, electroluminescent or other suitable display 5. Unlike liquid crystal and other passive displays, electroluminescent or other self-luminous displays are advantageous in that they do not require a separate light source. Below the window are four push button switches 6. The whole of the transceiver is designed to resist water ingress under pressures likely to be encountered during diving. Although separate transmitting and receiving transducers are shown, it is possible to provide a transducer or transducers which provide both functions.

Figure 2:
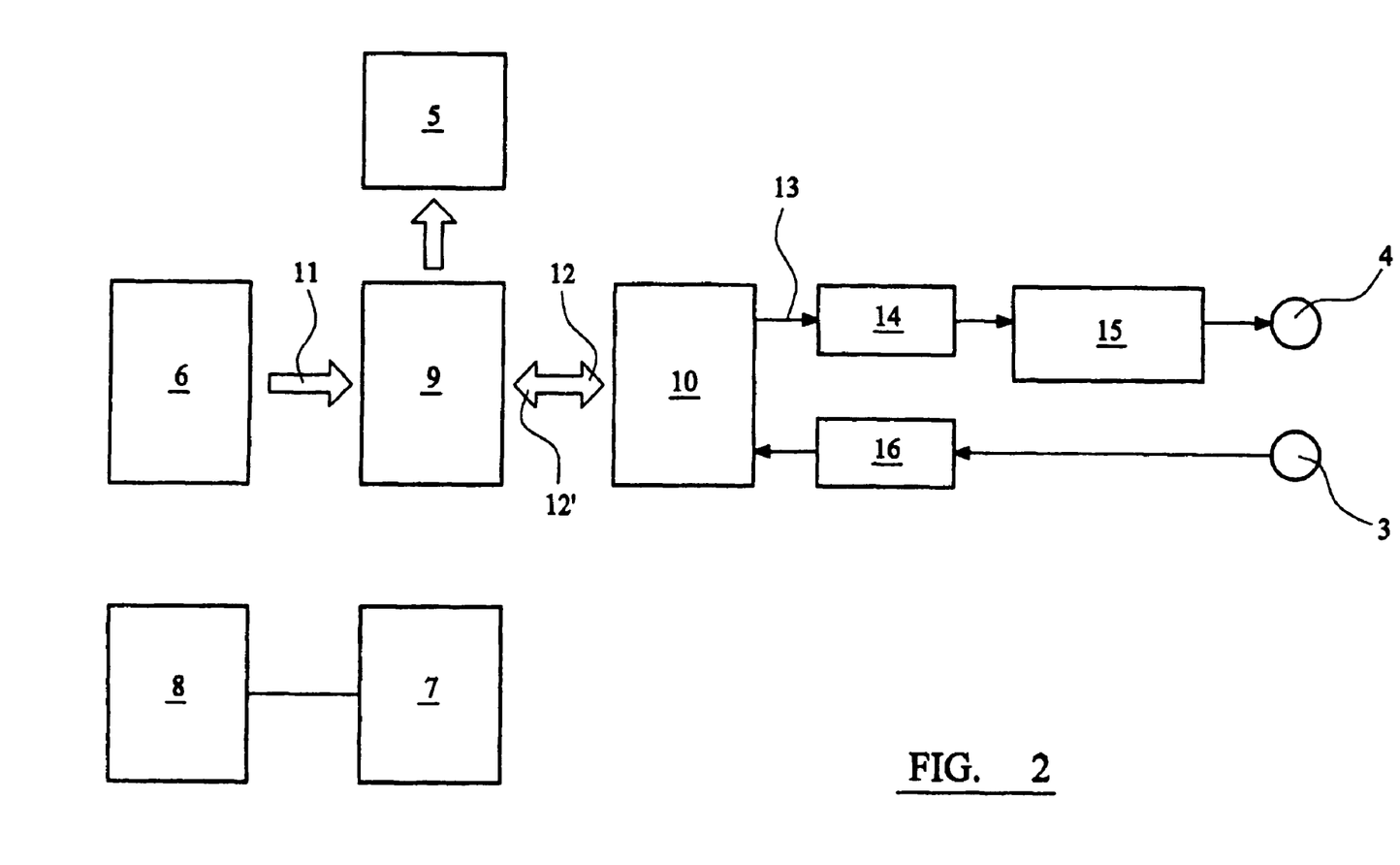
FIG. 2 schematically illustrates a block circuit diagram of circuitry within a transceiver 1 of FIG. 1.

FIG. 2 schematically illustrates a block circuit diagram of circuitry within a transceiver 1, which is operated by power supplies 7 driven from a 12 volt supply 8. Driver input and display functionality is performed by a microcontroller 9 linked to a further dedicated processor 10. In the transmitting mode the microcontroller 9 receives input from the pushbuttons 6, with a corresponding output on the display, and in response thereto eventually provides a message 11 input to the processor 10 in the form of a Reed-Solomon encoded digital stream 12, which is converted by the processor 10 to a composite modulated signal 13, amplified 14, and impedance matched 15 to the transducers 4.

In the receive mode, the output from the hydrophone 3 is preamplified 16 and input to the processor 10, which proceeds to reconstitute the transmitted information sequence 12' (where used, the prime denotes a received signal which generally corresponds to a transmitted signal). The latter is subject to Reed-Solomon decoding and other processing in processor 9 as appropriate for control of the display 5 in response to the information contained in the received signal.

Figure 3:
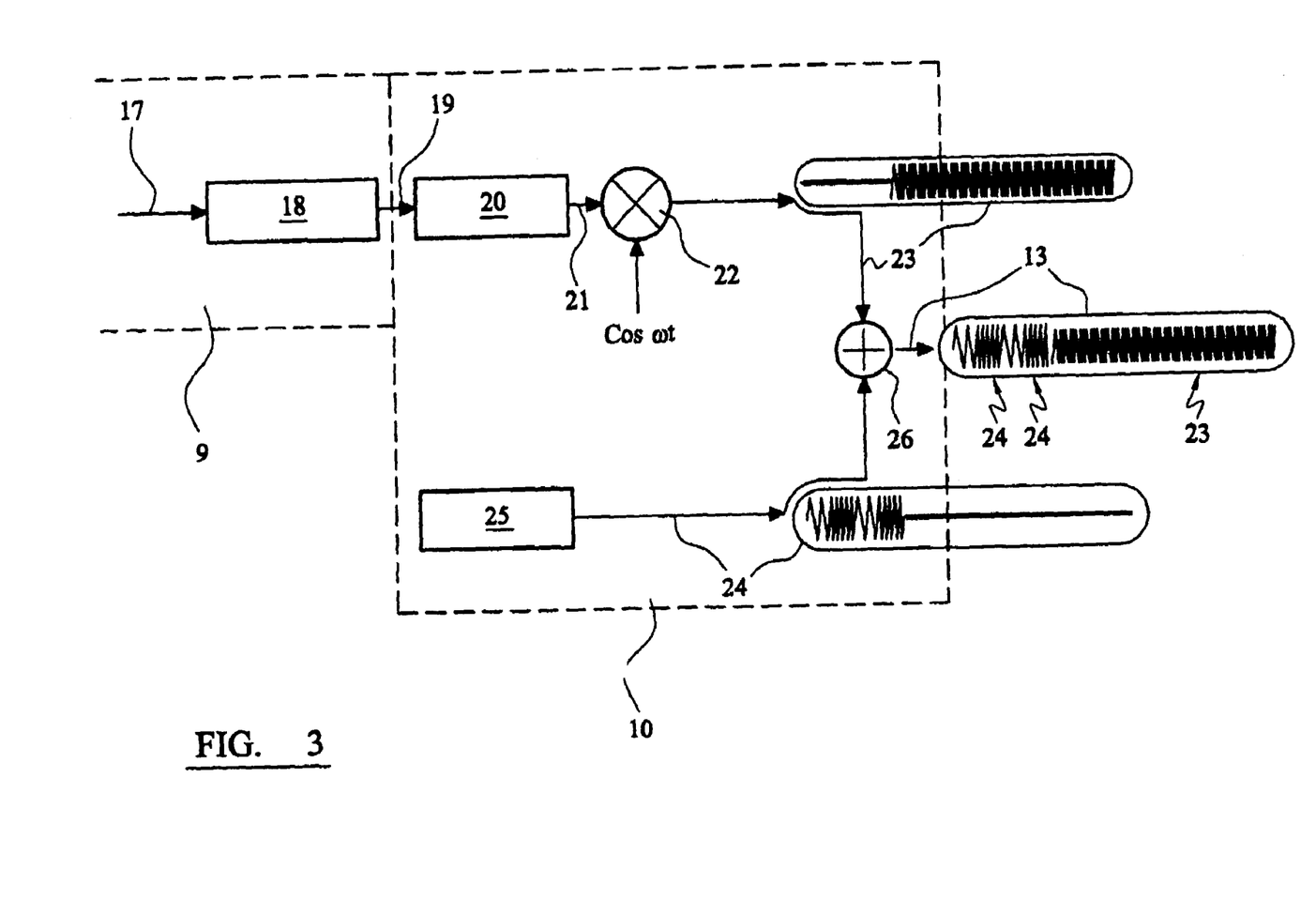
FIG. 3 illustrates in partial schematic form the transmit side of a transceiver.

FIG. 3 illustrates in partial schematic form the transmit side of a transceiver. Conjoint operation of pushbuttons 4 produces in any known manner a message 17 in the form of a digital sequence of predetermined format. Inter alia, the message may contain an identifier for the transmitting transceiver, an identifier for the destination transceiver, optionally an identifier peculiar a group of transceivers, and information that it is desired to send. The identifiers are useful where there are more than two transceivers (or a single transmitter/receiver pair), for example where there is one or more groups of divers operating from the same respective vessels, but could be omitted in other circumstances. The information could be a simple alpha-numeric sequence, or encoded, for example a set of numbers representing predetermined intelligible messages. Other codes or error checking facilities may also be included as appropriate. Provision may also be made for an identifier for messages intended for universal reception, for example alarm messages.

It will be understood that the pushbuttons 6 may be replaced or supplemented by any other manual input, such as a keyboard, or by any other form of input, for example a voice input, or an input from one or more transducers measuring local conditions in the water or peculiar to the diver (e.g. air supply, heart rate, dive depth and time, water temperature/pressure). Similarly it will be understood that the display 5 may be replaced or supplemented by any other recognisable output, such as an audible alarm or a flashing light to indicate reception of a message (which may need cancelling before a message is acknowledged), or a voice synthesiser (or a voice output if the transmitted information corresponds to an audio waveform), for example from a microphone. It will also be understood that the processor 9 or processor 10 may implement some form of known message transmission protocol, e.g. for confirmation of message reception, or for re-transmission as a message in the absence of such confirmation, or for checking that no other transmission is present before sending its message.

Message 17 is subject to Reed-Solomon encoding 18 in the processor 9 for error checking/correction at a destination transceiver. The resulting digital string 19, which is coupled to an m-sequence encoder 20 comprises symbols of length n bits and is prefaced by a predetermined block of n bits (not shown).

It is known to convert each symbol into a corresponding pseudo-random maximal-length sequence of length m chips (bits) (an "m-sequence") where m>n. Since a symbol of n bits will have $2^n$ possible bit patterns, there will be $2^n$ corresponding m-sequences, which are determined to be those selected from the $2^m$ possible sequences of length m such as will provide the best auto-correlation coefficients, to facilitate identification thereof in a received signal (and so of the corresponding n-bit symbol) and to reduce the amount of cross-correlation with others of the m-sequences.

In the embodiment, the encoder 20 has stored therein $2^n$ extended m-sequences each of which comprises one of said $2^n$ m-sequences but prefaced and/or followed by an extension of x or y chips respectively. The x-bit extension is a repeat of the final x chips of the m-sequence. The y-bit extension is a repeat of the first y chips of the m-sequence. The x- and y- bit extensions are sometimes termed "cyclic extensions", for obvious reasons. While either x or y may be zero, it is preferred that both are finite quantities. While x and y may be unequal, in the embodiment they are equal. Thus in the case of a base sequence of the form ABC where B represents a core portion and A and C are terminal portions, an extended m-sequences of the form CABC, or ABCA, or CABCA, could be derived as desired.

The function of the extensions will be explained later, as will the preferred sizes of m, n, x and y. For ease of reference and distinction, an "normal" m-sequence will henceforth be referred to as a "base sequence" and an extended m-sequence will be referred to as an "extended sequence".

Figure 4:
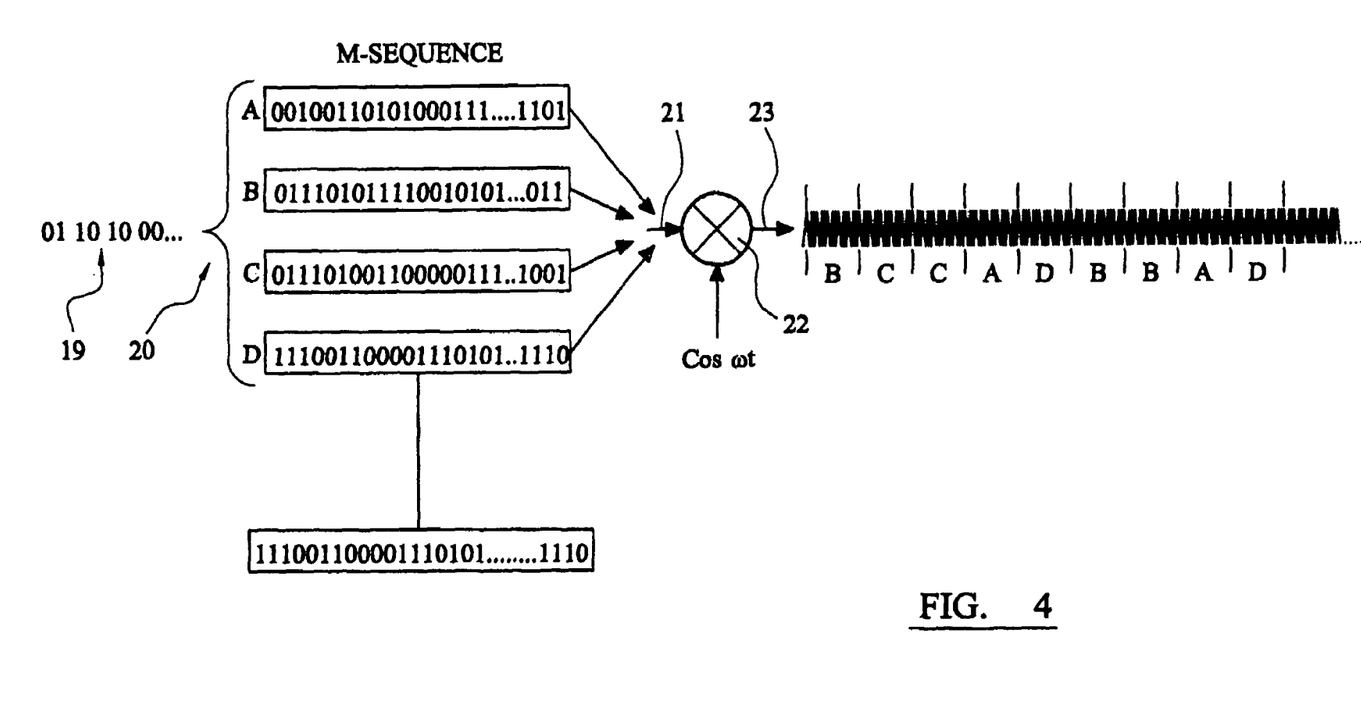
FIG. 4 schematically illustrates the working of a detail of the circuitry shown in FIG. 3.

As schematically shown in FIG. 4 for the case where n is 2, giving rise to 4 extended sequences A, B, C and D, encoder 20 acts on the string 19 of symbols to select the corresponding extended sequence for forward transmission to a modulator 22 where it is bi-phase modulated to a suitable carrier frequency ω. Thus the input 21 to modulator 22 consists of a series of extended sequences, the first corresponding to the predetermined sequence mentioned above, and the rest determined by the message 12. Two chirp signals 24 of predetermined form length and relative timing are produced by a generator 25 and added at 26 at the front of the modulated signal 23 to produce the composite signal 13 which is coupled to the transducers 4 for transmission to another diver or a surface vessel, for example.

It will be appreciated that there is a predetermined extended sequence between the extended sequences representing the message 12 and the chirp signals 24. It is possible for this to be provided in a variety of ways, for example by the use of a separate generator, by arranging for encoder 18 to generate a predetermined symbol at the start of its encoding process, by arranging for encoder 20 to generate the predetermined extended sequence at the start of its encoding process, or by arranging the chirp generator 14 to produce both the chirps followed by the predetermined extended sequence.

The extended m-sequences employed by the encoder 9 are each composed of a base m-sequence of m chips, where m is significantly greater than n, and preferably m/n is at least 16, more preferably at least 32, and even more preferably at least 64 (the ratio m/n effectively defines the processing gain one achieves in the receiver correlators. In practice fairly large processing gains may be used to help overcome multipath and user interference. For this application the ratio m/n is 255/2. Obviously this ratio impacts on thee system data rate and it would be possible to reduce the ration to provide higher data throughput. The base m-sequences are pseudo-random maximal-length m-sequences providing in known manner the best auto-correlation coefficients for their length, to facilitate identification thereof (and so of the corresponding n-bit symbol) and to reduce the amount of cross-correlation with others of the base m-sequences.

The signal 13 comprises the (non-spaced) sequence of chirp 1, chirp 2, $E_0$, $(Em)_x$, where chirp 1 and chirp 2 are the chirps 24, $E_0$ is the predetermined extended sequence modulated on the carrier and $(Em)_x$ is the series of extended sequences determined by the message 7 modulated on the carrier. Since as transmitted the duration of each of these items is known, their relative timings as transmitted are also known. After certain initial corrections and demodulation, to be described, it will thus be possible to break down a received signal into a like sequence.

Figure 5:
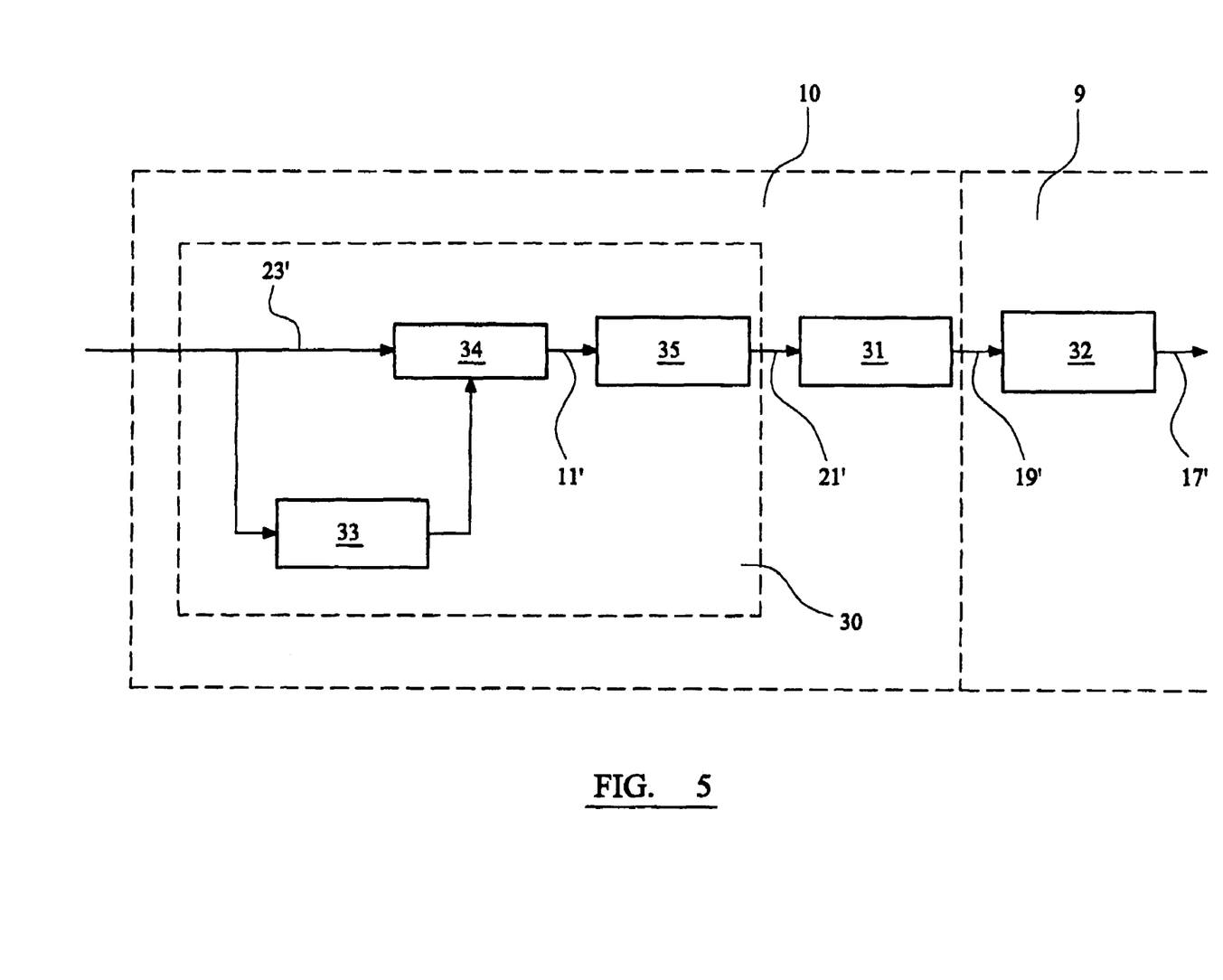
FIG. 5 schematically illustrates part of the receive circuitry in the transceiver 1 of FIG. 1.

FIG. 5 schematically illustrates part of the receive circuitry in the transceiver 1, where the portion 30 serves to effect the aforesaid initial correction and demodulation of the output 23' from the receive transducer 3 to provide a series 21' of received extended sequences.

Assuming initially that the transmitted signal is subject neither to Doppler nor multi-path propagation, it could be directly received demodulated and the chirps extracted to provide a signal 21' similar to that produced by the encoder 20, for subsequent decoding at an m-sequence decoder 31 followed by a Reed-Solomon decoder 32 to reconstitute the message as an output 17'.

In such a case, the chirp signals and extended sequence $E_0$ would function merely to denote the start of a transmission, providing the timing whereby $(Em)_x$ may be split up into component extended sequences. In known manner in decoder 31 each component Em is passed through $2^n$ parallel correlators relating respectively to each of the base sequences, the outputs of which are compared to determine which bit pattern is to replace that extended sequence. The extended sequences serve to reduce the sidelobe levels when performing the correlation between the replica sequence and the received sequence which may have multipath. While the extended sequences could also serve to accommodate any jitter in the received signal, in practice jitter is accommodated by summing correlations at the time delays of the significant multipath components plus or minus one or two lags to allow for any jitter.

Figure 6:
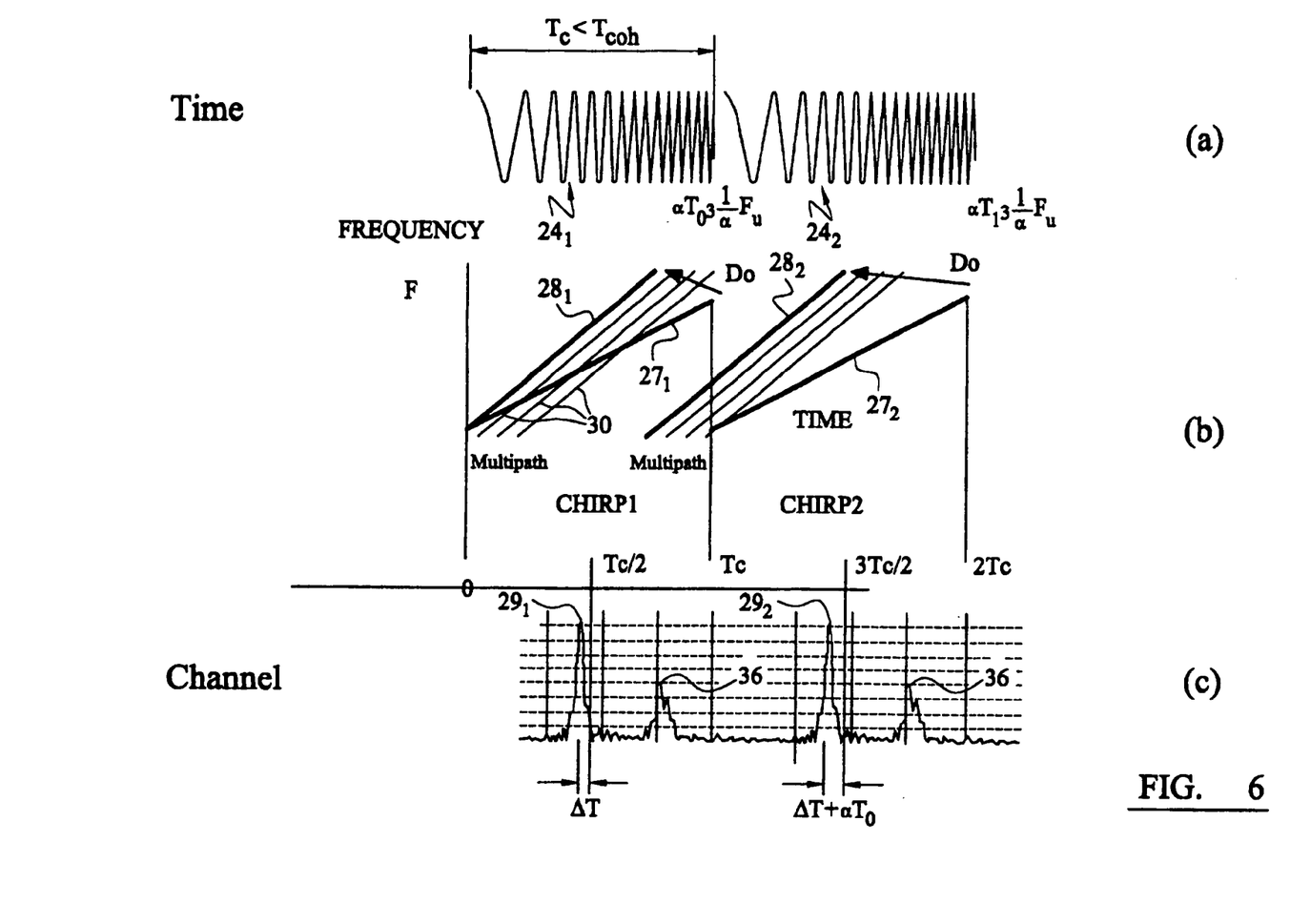
FIGS. 6 to 8 are plots to illustrate the operation of parts of the circuitry shown in FIG. 5, with reference to chirp waveforms at the commencement of a transmitted signal.

The top plot (a) of FIG. 6 shows the chirp signals 24 as immediately successive chirps $24_1$ and $24_2$ each of duration $T_C$, the first chirp commencing at time T=0. The middle plot (b) of frequency F against time T shows lines $27_1$ and $27_2$ corresponding to chirps $24_1$ and $24_2$ as transmitted, and, in the absence of Doppler and multi-path propagation, as received.

When Doppler is present, but without multi-path propagation, the received signal is effectively a version of the transmitted signal which is compressed or expanded by an amount and in a direction determined by the effective relative motion between source and receiver. The lines $28_1$ and $28_2$ of FIG. 6 illustrate this for the two chirps when the Doppler is of a sense giving waveform compression. It will be seen that the plots 27 are effectively moved as broadly indicated by the arrows Do to give the plots 28 which are of shorter duration and rising to higher terminal frequencies, the amount and sense of the movement being indicative of the magnitude and sense of the Doppler effect. Also, since the two chirps $28_1$ and $28_2$ are immediately consecutive, the start of plot $28_2$ is displaced from $T_C$ by an amount and in a sense indicative of the magnitude and sense of the Doppler effect.

The magnitude of the complex correlation of the received signal against the original chirp waveform produces the signal shown in plot (c) of FIG. 6, where the main peaks $29_1$ and $29_2$ correspond to the plots $28_1$ and $28_2$ respectively. Instead of sharp peaks at $T_C/2$ and $3T_C/2$ which would be produced from the plots 27, the peaks 29 are somewhat broadened and occur earlier by amounts $\Delta T$ and $(\Delta T + \alpha Tc)$ respectively.

It is possible to gauge Doppler from the values of $\Delta$ and/or $\alpha$. However, as previously mentioned, in reality the received signal is also subject to multi-path propagation, as shown in the finer lines 30 of FIG. 6(b), representing sub-signals, which tends to render less precise the information gained from the main signal.

Figure 7:
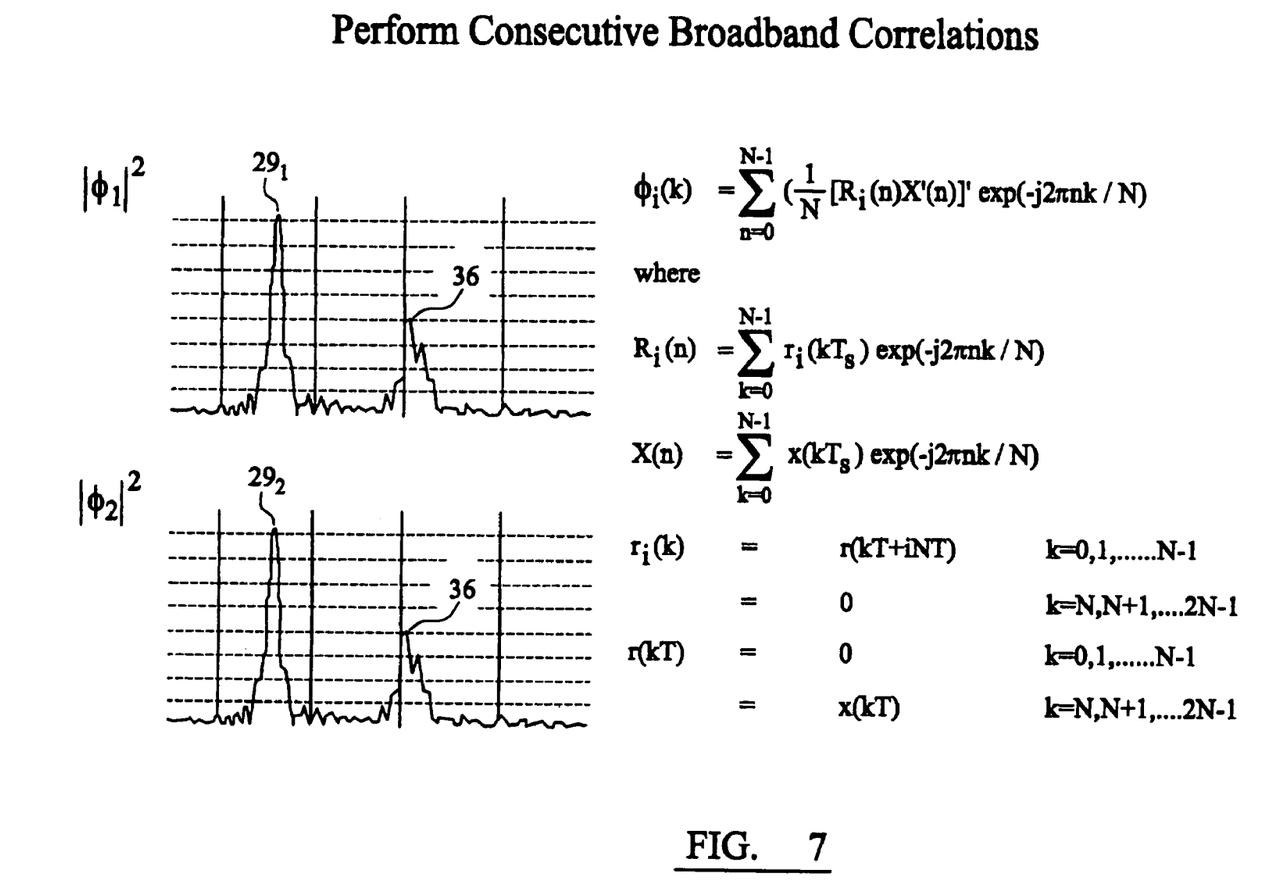

It is therefore preferred to generate and buffer the complex correlation result between the two received chirp signals and the original chirp waveform, to provide complex output signals $\phi_1$, $\phi_2$ as depicted by $|\phi_1|^2$ and $|\phi_2|^2$, FIG. 7, similar to those of FIG. 6(c). By inspection of the output signals (e.g. as stored in a buffer), and use of a thresholding function, a portion or selected time window is selected from the output signal. These portions lie about the times when the correlation outputs have their respective maximum values, and are sized to contain other significant signal peaks arising from multi-path propagation. In practice, the thresholding function is derived from noise statistics prior to arrival of the transmission, and is arranged to ensure that only the strong paths contribute to the detection and raking process.

Figure 8:
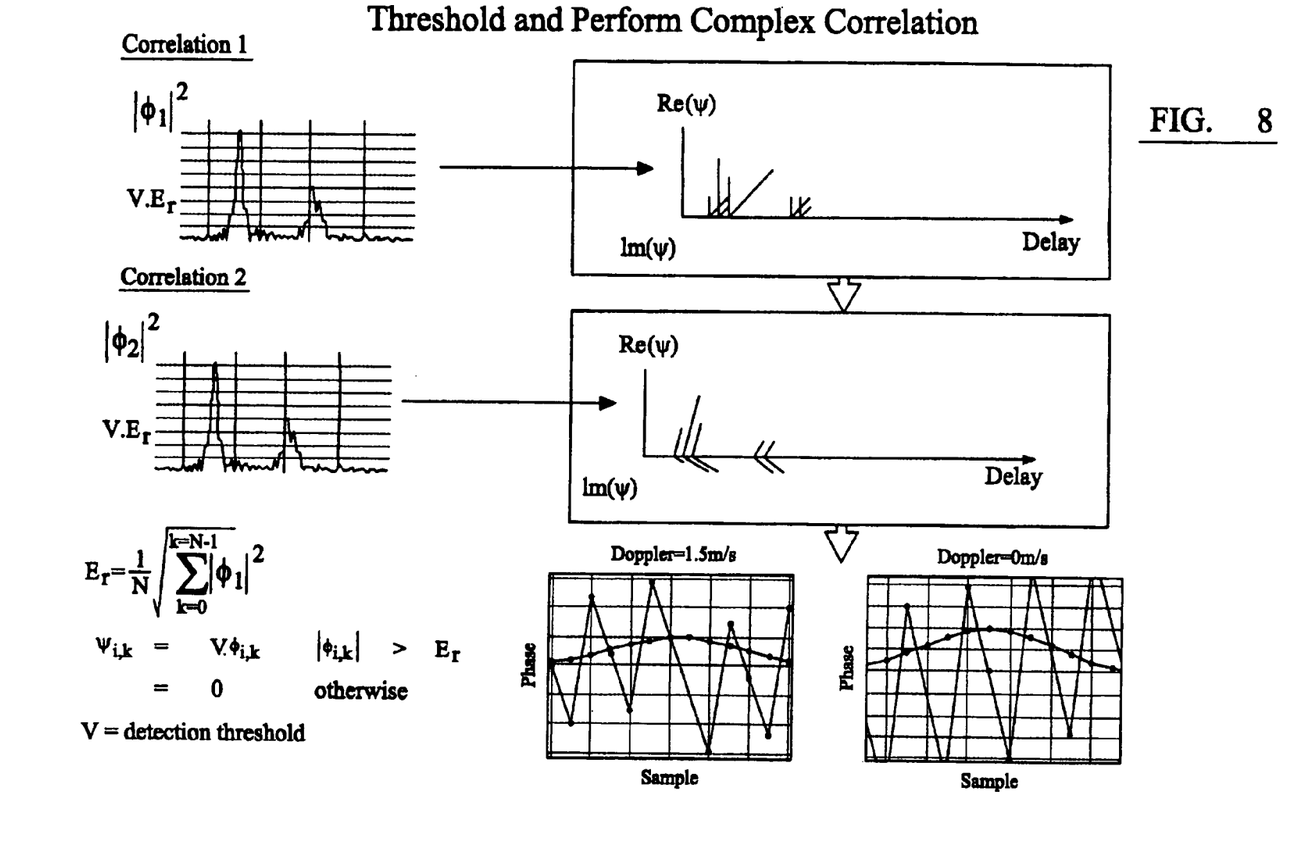

Subsequently a complex cross-correlation is performed of each selected portion against the other, as is illustrated in FIG. 8. This process, provides a more accurate determination of Doppler effect, and uses information not only from the main signal, but also from significant sub-signals occurring close in time to the main signal (under many conditions most sub-signals will arrive closely spaced from the main signal, and signals further temporally spaced therefrom will have relatively little energy).

In FIG. 5, the Doppler measurement and start of message information based on the chirps is derived in synchronisation circuitry 33 which provides an output for controlling a re-sampler 34 to which is coupled the output of the preamplifier 16. In this manner the received signal is converted to a (passband) signal 11' having a carrier at the frequency $\omega$ of the modulator 10, for demodulation or down conversion in a digital converter 35 to provide the signal 21'.

When multiple path propagation is taken into account, the correlated chirp signals may take the form shown in FIG. 7, where there is at least one additional subordinate peak 36 corresponding to a sub-signal (these also occur in FIG. 6(c)).

As shown, the peaks are actually composite, with components corresponding to closely spaced micro paths which constitute a macro-path for the sub-signal in question, but the fine structure is conveniently ignored.

It is known to process multi-path signals to produce a reinforced main signal, and to increase the signal to noise ratio, or the veracity, of the main signal. One known method of so doing is to measure the timing between the subordinate signals and the main signal, and to control a filter such as a FIR filter so that the signals are effectively added. For example the filter may take the form of a tapped delay line into which the original signal is fed and from which signals are taken at controlled delays so that the various paths are brought into synchronism, the respective signal components being read and added together. The controlled delays may be variable. The general process is known as "raking".

While the channel structure information provided by the correlation at the synchronisation circuit 33 could be used for dealing with multi-path propagation (see FIG. 7), in the embodiment of FIG. 5 this function is left to the m-sequence decoder 31, as will be described later. Thus the signals 11', 21' from re-sampler 34 and converter 35 still retain the multi-path structure.

As previously noted, using the known relative timing between portions of the transmitted signal 21', blocks or sequences of length m in positions corresponding to the original (unextended—i.e. the extensions are ignored for this purpose) m-sequences are selected from the received and temporally corrected signal for correlation with the $2^n$ base m-sequences to determine the corresponding portion (symbol) of the signal 19' and message 17'. If the correlators act directly on the signal 21' as received, their outputs in fact also contain information regarding the sub-signals, and if identification of the m-sequences is performed directly on these outputs, the sub-signal information can interfere therewith.

Therefore on the basis of the determined channel structure the signal 21' is subject to a filtering process within the decoder 31 which in principle is similar to that described above in relation to the FIR filter, so as constructively to add/synchronise signals with different times of arrival whereby to increase the signal to noise ratio and to reduce the effects of multi-path propagation, and the "filtered" outputs thus obtained are used for the aforesaid determination (by correlation) of the m-sequences. It is preferred that this filtering process is weighted based on the relative energies of the channel paths previously identified, a process sometimes known as maximum ratio combining (MRC).

This whole process is preferably carried out in both the time and Fourier domains as appropriate for ease of signal processing, and adds considerably to the robustness of the communication. Preferably, when calculating the channel structure the correlation processing is performed in the Fourier domain as this allows faster evaluation of the time lagged correlation result. After determining the significant path delays and their weights, the correlation processing reverts to the time domain, thus saving processing time since it is necessary to sum the weighted correlations for each path delay and for each possible sequence. So for $2^n$ sequences and P paths it is necessary to compute $P \times 2^n$ complex correlations. The largest correlation result from each of the $2^n$ sequences identifies the maximum likelihood transmitted symbol. When this has been identified then the system will re-compute the channel estimate by performing a Fourier domain correlation between the maximum likelihood symbol and the current received time vector. This resets the path delays and weights ready for the next received sequence. It inherently enables the system to track Doppler changes (timing drift) from sequence to sequence either due to imprecise initial Doppler estimation or from platform acceleration.

Thus far, fixed Doppler and multi-path propagation could be accounted for. However, both of these factors may vary over the length of a transmission, thus potentially importing errors.

As has already been noted for the case of the two chirps 24, complex autocorrelation provides information on the channel structure, and a subsequent complex cross-correlation of the autocorrelation results against each other provides information concerning Doppler. This process can be carried forward to the use of the received extended sequences.

The first received extended sequence is known, and the Doppler is assumed to be that obtained by use of the chirp signals, so permitting re-sampling and demodulation of the first sequence. Then (auto) correlation of the known base sequence against the known first extended sequence provides a correlation signal with more precise channel structure information.

In a version of the system where Doppler is also continuously updated from measurements performed on successive pairs of sequences, the updated Doppler (or differential Doppler) measurement could then be fed back to the decoder 31 and the re-sampler 34 for re-sampling the second modulated extended sequence, suitably buffered if necessary. In addition the updated channel information can likewise be used within the decoder 31 for use during raking of the second modulated extended sequence. However, for providing a further update on channel information, once the second extended sequence is identified the second modulated extended sequence of the unraked signal 21' is correlated against the corresponding base sequence and the updated channel structure is derived from the result in known manner for use in raking the third modulated extended sequence, and so forth in an iterative process.

While there is a lag in the production of these measurements, it is sufficiently small that there is little or no likelihood of corruption in the signal 19' on account of Doppler or multi-path propagation.

The use of an extended sequence has already been described in terms of dealing with time jitter in the received signal. It will be observed that it also helps in the obtaining of information regarding sub-signal paths, which might be missed if using a transmitted base sequence.

Thus this embodiment of the invention enables the provision of a broadband transmission, not so subject to fading as a narrowband transmission, copes well with Doppler effects, and utilises more of the transmitted signal energy, including energy from multiple paths, to enhance accuracy of message reproduction.

In the present embodiment n is 2, m is 255, a cyclic extension is provided at each end of length 20 chips. These values are a matter of choice according to the transmission conditions likely to be encountered, computing power available, and other circumstances. With present computing powers, in particular for portable transceivers, n is preferably no more than 4, to place a limit on the number of correlations that are necessary; however, it will be appreciated that greater values of n can enable faster transmission overall, albeit at the expense of a rapidly increasing number $n^2$ of correlations to be performed at the receiving transceiver.

These latter considerations must be balanced against the fact that an increase in n for a fixed value of m reduces the ratio m/n, which ratio effectively defines the processing gain obtainable in the receiver correlators. In the resent application it is preferred to use fairly large processing gains to help overcome multi-path and user interference. The value of m/n is preferably at least 31, and preferably at least 63 and even more preferably at least 127. The length of the extension(s) preferably lies between 16 and 128 when m is 255, and more generally it lies between $m^{1/2}$ and m/2.

What is claimed is:

1. A digital acoustic transmission device comprising a transmission transducer means for transmitting an acoustic signal through water in response to an output signal, means for receiving or generating a digital information sequence, means for modulating said digital information sequence on a carrier, and means for coupling the modulated digital sequence to said transducer means, wherein said coupling means includes means for prefacing said modulated carrier with at least two pulse signals of known timing relative to each other and to the modulated digital sequence to provide said output signal.

2. A device according to claim 1 wherein said pulse signals are of identical form.

3. A device according to claim 1 or claim 2 wherein said pulse signals have good correlation properties.

4. A device according to claim 1 wherein a said pulse signal is a chirp.

5. A transmission device according to claim 1 including means for dividing said digital information sequence into a series of equal length blocks (symbols) for modulating on said carrier.

6. A device according to claim 1 and including means for effectively providing a predetermined digital sequence (symbols) at the start of the digital information sequence.

7. A transmission device according to claim 5 or claim 6 and including means for encoding the or each said symbol for modulating on said carrier.

8. A transmission device according to claim 1 and including means for incorporating redundancy into said information sequence for error correction.

9. A transmission device according to claim 1 wherein said modulating means is arranged to perform bi-phase modulation.

10. A digital underwater receiving device adapted for responding to a signal transmitted from a transmission device according to claim 1, the receiving device comprising receiving transducer means for receiving said acoustic wave signal, and pulse waveform detection means for identifying the occurrence of said two pulse signal waveforms as the commencement of a transmission, and means for demodulating or down-converting the carrier modulated output of the receiving transducer means to provide a received said digital information sequence.

11. A receiving device according to claim 10 further comprising Doppler gauging means for deriving from the received transmission a measure of Doppler effect.

12. A receiving device according to claim 11, and including means for determining the time relation between the two pulse waveforms and comparing it with the predetermined timing of the transmitted waveforms for determining Doppler effect.

13. A receiving device according to claim 12, wherein the pulse waveforms are chirps, the device including means for measuring a frequency characteristic of a received chirp and comparing it with a corresponding characteristic of a transmitted chirp for determining Doppler effect.

14. A receiving device according to claim 13 and including pulse correlating means for correlating each of said two pulse waveforms against a corresponding predetermined pulse waveform and for cross-correlating the resulting two output signals against each other to provide a measure of Doppler effect.

15. A receiving device according to any one of claims 10 to 14 for use with a transmission device in which the digital information sequence has been divided into a series of symbols of equal length blocks prior to modulation, and arranged for deriving timing information from the received signal and for partitioning the received signal in response thereto so as to enable the formation of a corresponding series of received symbols.

16. A receiving device according claim 15 and including symbol correlating means for correlating a received symbol against a plurality of stored symbols for identifying the symbol represented by the received symbol.

17. A receiving device according to claim 16, and further comprising cross-correlation means for cross-correlating the outputs of the symbol correlation means for two successive symbols against each other to provide a measure of Doppler effect.

18. A receiving device according to claim 14 wherein said correlating and cross-correlating means comprises complex correlating means.

19. A receiving device according to claim 10 and including resampling means for correcting the received modulated signal for Doppler effect.

20. A receiving device according to claim 10 and including means for gauging multi-path transmissions from the received transmission, and sub-signal means for effectively synchronizing said multi-path transmissions and adding them together.

21. A receiving device according to claim 14 wherein said multi-path gauging means is responsive to the output of said pulse waveform correlating means.

22. A receiving device according to claim 21 wherein said multi-path gauging means is responsive to the output of a said symbol correlating means.

23. A communication system comprising at least one transmission device comprising a transmission transducer means for transmitting an acoustic signal through water in response to an output signal, means for receiving or generating a digital information sequence, means for modulating said digital information sequence on a carrier, and means for coupling the modulated digital sequence to said transducer means, wherein said coupling means includes means for prefacing and modulated carrier with at least two pulse signals of known timing relative to each other and to the modulated digital sequence to provide said output signal and at least one separate receiving device according to any one of claims 10 to 14.

24. A system according to claim 23 wherein there is a plurality of said transmission devices and/or a plurality of said receiving devices.

25. A digital underwater transceiver effectively comprising a transmission device comprising a transmission transducer means for transmitting an acoustic signal through water in response to an output signal, means for receiving or generating a digital information sequence, means for modulating said digital information sequence on a carrier, and means for coupling the modulated digital sequence to said transducer means, wherein said coupling means includes means for prefacing said modulated carrier with at least two pulse signals of known timing relative to each other and to the modulated digital sequence to provide said output signal and a receiving device according to any one of claims 10 to 14.

26. A digital underwater communication system comprising a plurality of transceivers according to according to claim 25.

27. A method for transmitting a sequence of digital bits representing information through water, in which the sequence is modulated onto a carrier, wherein the modulated carrier is prefaced by two predetermined pulse waveforms of known timing relative to each other and to the modulated digital sequence prior to being coupled to an acoustic transducer.

28. A method according to claim 27 wherein the digital sequence is partitioned into equal length blocks prior to modulation.

29. A method of receiving a sequence of digital bits transmitted according to the method of claim 28, and the relation between successive blocks is analysed to provide Doppler and/or multipath transmission data.

30. A method of receiving a sequence of digital bits transmitted according to the method of claim 27 or claim 28, wherein the relation between the two pulse waveforms is analysed to provide Doppler and/or multipath transmission data.

31. A method according to claim 29 wherein the Doppler data is employed for resampling the received modulated signal.

32. A method according to claim 29 wherein the multipath data is employed for raking the received signal.

* * * * *